United States Patent
Nakayama et al.

(10) Patent No.: US 10,910,839 B2
(45) Date of Patent: Feb. 2, 2021

(54) POWER CONTROL SYSTEM AND CONTROL METHOD FOR POWER CONTROL SYSTEM

(71) Applicant: KYOCERA Corporation, Kyoto (JP)

(72) Inventors: Shusuke Nakayama, Yokohama (JP); Tetsuya Takenaka, Yamato (JP)

(73) Assignee: KYOCERA CORPORATION, Kyoto (JP)

( * ) Notice: Subject to any disclaimer, the term of this patent is extended or adjusted under 35 U.S.C. 154(b) by 348 days.

(21) Appl. No.: 15/771,696

(22) PCT Filed: Oct. 28, 2016

(86) PCT No.: PCT/JP2016/004752
§ 371 (c)(1),
(2) Date: Apr. 27, 2018

(87) PCT Pub. No.: WO2017/073076
PCT Pub. Date: May 4, 2017

(65) Prior Publication Data
US 2018/0337533 A1    Nov. 22, 2018

(30) Foreign Application Priority Data
Oct. 28, 2015   (JP) ................. 2015-212410

(51) Int. Cl.
*H02J 3/38*    (2006.01)
*H02J 3/40*    (2006.01)
*H02J 3/46*    (2006.01)

(52) U.S. Cl.
CPC ............... *H02J 3/383* (2013.01); *H02J 3/38* (2013.01); *H02J 3/387* (2013.01); *H02J 3/40* (2013.01); *H02J 3/46* (2013.01); *H02J 3/388* (2020.01)

(58) Field of Classification Search
CPC .... H02J 3/383; H02J 3/38; H02J 3/387; H02J 3/40; H02J 3/46; H02J 3/388
See application file for complete search history.

(56) References Cited

U.S. PATENT DOCUMENTS

| | | |
|---|---|---|
| 6,683,799 B2 | 1/2004 | Kato et al. |
| 10,211,635 B2 | 2/2019 | Nakayama |
| 2003/0117753 A1 | 6/2003 | Kato et al. |
| 2016/0094087 A1 | 3/2016 | Satake et al. |
| 2016/0315474 A1 | 10/2016 | Satake |
| 2017/0012428 A1 | 1/2017 | Nakayama |

(Continued)

FOREIGN PATENT DOCUMENTS

| | | |
|---|---|---|
| EP | 2782205 A1 | 9/2014 |
| JP | 9-215203 A | 8/1997 |
| JP | 2002-325353 A | 11/2002 |

(Continued)

*Primary Examiner* — Daniel Kessie
(74) *Attorney, Agent, or Firm* — Hauptman Ham, LLP (57) ABSTRACT

A power control system comprises: a dummy output unit configured to supply a dummy current to a current sensor during independent operation, and not supply the dummy current to the current sensor during interconnected operation, the dummy current corresponding to forward power flow; and a controller configured to determine whether a supply state of the dummy current is normal, and control whether to continue operation of the dummy output unit.

10 Claims, 9 Drawing Sheets

(56) References Cited

U.S. PATENT DOCUMENTS

2017/0250535 A1* 8/2017 Nishigai ................ H02M 3/04

FOREIGN PATENT DOCUMENTS

| | | |
|---|---|---|
| JP | 2006-187148 A | 7/2006 |
| JP | 2007-49770 A | 2/2007 |
| JP | 2008-253033 A | 10/2008 |
| JP | 2013-233861 A | 11/2013 |
| JP | 2014-212656 A | 11/2014 |
| WO | 2015/083373 A1 | 6/2015 |
| WO | 2015/111410 A1 | 7/2015 |

* cited by examiner

| No. | OUT1 OUTPUT STATE | IN1 DETECTION STATE | DETERMINATION | OPERATION |
|---|---|---|---|---|
| 1 | H | L | NORMAL | CONTINUE |
| 2 | H | H | ABNORMAL | ERROR NOTIFICATION |
| 3 | L | H | NORMAL | CONTINUE |
| 4 | L | L | ABNORMAL | ERROR NOTIFICATION<br>STOP INTERCONNECTED OPERATION<br>TURN OFF INDEPENDENT OPERATION SWITCH<br>STOP INVERTER |

| No. | SYSTEM STATE | IN1 OUTPUT VALUE | DETERMINATION | OPERATION |
|---|---|---|---|---|
| 1 | INDEPENDENT OPERATION | GREATER THAN 0 | NORMAL | CONTINUE |
| 2 | INDEPENDENT OPERATION | 0 | ABNORMAL | ERROR NOTIFICATION |
| 3 | INTERCONNECTED OPERATION | 0 | NORMAL | CONTINUE |
| 4 | INTERCONNECTED OPERATION | GREATER THAN 0 | ABNORMAL | ERROR NOTIFICATION<br>STOP INTERCONNECTED OPERATION<br>TURN OFF INDEPENDENT OPERATION SWITCH<br>STOP INVERTER |

POWER CONTROL SYSTEM AND CONTROL METHOD FOR POWER CONTROL SYSTEM

CROSS REFERENCE TO RELATED APPLICATION

This application is a National Phase of International Application Number PCT/JP2016/004752, filed Oct. 28, 2016, which claims priority to Japanese Patent Application No. 2015-212410 filed on Oct. 28, 2015.

TECHNICAL FIELD

The present disclosure relates to a power control system and a control method for a power control system.

BACKGROUND

Power control apparatuses for power generation systems that include power generation facilities such as solar panels and capable of grid interconnected operation and independent operation are known. In grid interconnected operation, AC power is output and interconnected to a commercial power grid (hereafter abbreviated to "power grid" as appropriate). In independent operation, AC power is output and paralleled off from the power grid.

Power control apparatuses for power storage systems that include power storage facilities such as storage cells charged with power from a power grid and also capable of grid interconnected operation and independent operation, like the above-mentioned power control apparatus, are known.

SUMMARY

A power control system according to the present disclosure comprises: a dummy output unit configured to supply a dummy current to a current sensor during independent operation, and not supply the dummy current to the current sensor during interconnected operation, the dummy current corresponding to forward power flow; and a controller configured to determine whether a supply state of the dummy current is normal, and control whether to continue operation of the dummy output unit.

A control method for a power control system according to the present disclosure comprises: supplying a dummy current to a current sensor during independent operation, and not supplying the dummy current to the current sensor during interconnected operation, the dummy current corresponding to forward power flow; determining whether a supply state of the dummy current is normal; and controlling whether to continue the supply state.

DETAILED DESCRIPTION

A distributed power source in a power control system, in order to prevent reverse power flow of generated power to a power grid, may stop power generation upon detecting reverse power flow. In this case, a mechanism for reducing erroneous operation is needed so as to, for example, prevent reverse power flow of generated power to a power grid during grid interconnected operation. With a power control system and a control method for a power control system according to the present disclosure, it is possible to reduce reverse power flow of power generated by a predetermined distributed power source to a power grid during grid interconnected operation.

Embodiments of the present disclosure are described in detail below, with reference to drawings.

Embodiment 1

A power control system according to Embodiment 1 of the present disclosure is described below. The power control system according to this embodiment, in addition to power supplied from a power grid, includes a distributed power source that supplies sellable power and/or a distributed power source that supplies contractually non-sellable power. Examples of distributed power sources that supply sellable power include systems for supplying power by solar power generation or the like. Here, the power grid is an electric power grid, and is a system that integrates the power generation, power transformation, power transmission, and power distribution necessary for a consumer facility to receive power. In more detail, the power grid includes power distribution equipment through which the consumer facility is supplied with power. The contract mentioned here is made between an electric power provider and a consumer supplied with power.

Examples of distributed power sources that supply contractually non-sellable power include storage cell systems that can be charged and discharged, fuel cell systems including fuel cells such as solid oxide fuel cells (SOFC), and gas power generator systems for generating power using gas fuel. This embodiment describes an example in which a solar cell is provided as a distributed power source that supplies sellable power. This embodiment also describes an example in which a storage cell and a power generation apparatus such as a fuel cell or a gas power generator are provided as distributed power sources that supply contractually non-sellable power. However, depending on the contract between a provider and a consumer or the national system and the like, the distributed power source that supplies sellable power may include a power storage facility and/or a fuel cell.

Figure 1:
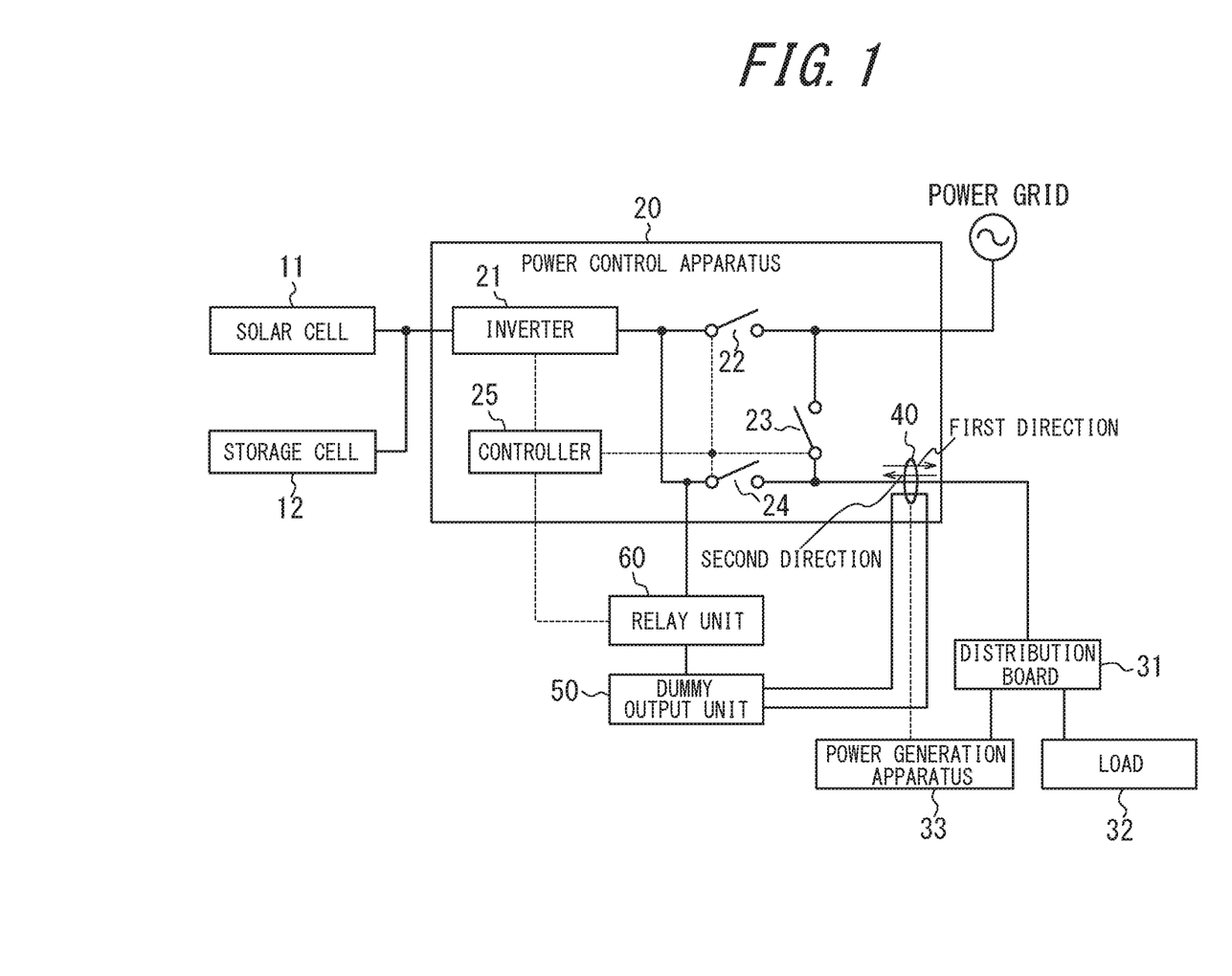
FIG. 1 is a block diagram of a power control system according to Embodiment 1 of the present disclosure.

FIG. 1 is a block diagram illustrating the schematic structure of the power control system according to Embodiment 1 of the present disclosure. The power control system according to this embodiment includes a solar cell 11, a storage cell 12, a power control apparatus 20, a distribution board 31, a load 32, a power generation apparatus 33, a current sensor 40, a dummy output unit 50, and a relay unit 60. The power generation apparatus 33 includes a fuel cell or a gas power generator. The power control system normally performs grid interconnected operation, to supply power from a power grid and power from each distributed power source (solar cell 11, storage cell 12, power generation apparatus 33) to the load 32.

In the case in which no power is supplied from the power grid due to a power failure or the like, the power control system performs independent operation to supply power from each distributed power source (solar cell 11, storage cell 12, power generation apparatus 33) to the load 32. When the power control system performs independent operation, each distributed power source (solar cell 11, storage cell 12, power generation apparatus 33) is paralleled off from the power grid. When the power control system performs interconnected operation, each distributed power source (solar cell 11, storage cell 12, power generation apparatus 33) is paralleled to the power grid. The state of being paralleled off from the power grid is a state of being electrically disconnected from the power grid. The state of being paralleled to the power grid is a state of being electrically connected to the power grid.

In FIG. 1, the solid lines between the functional blocks represent wiring through which power flows. In FIG. 1, the dotted lines between the functional blocks represent the flow of control signals or communicated information. The communication represented by the dotted lines may be wired communication or wireless communication. Various schemes are available for the communication of control signals and information, including each layer. For example, the communication may be performed by a short distance communication scheme such as ZigBee® (ZigBee is a registered trademark in Japan, other countries, or both). The communication of control signals and information may also be performed using various transmission media such as infrared communication and power line communication (PLC). Any of various communication protocols defining the logical layer, such as ZigBee SEP 2.0 (Smart Energy Profile 2.0), ECHONET Lite® (ECHONET Lite is a registered trademark in Japan, other countries, or both), and KNX may be operated on lower layers including the physical layer suitable for each communication.

The solar cell 11 converts energy from sunlight into DC power. For example, the solar cell 11 is formed by connecting power generators having photoelectric conversion cells in a matrix to output a predetermined short-circuit current (e.g. 10 A). The type of the solar cell 11 is not limited as long as it is capable of photoelectric conversion. Examples include a silicon-based polycrystalline solar cell, a silicon-based monocrystalline solar cell, and a thin-film solar cell of CIGS or the like.

The storage cell 12 includes a storage cell such as a lead storage cell, a lithium ion cell, a nickel-metal-hydride cell, a Na—S cell, or a redox flow cell. The storage cell 12 can be discharged to supply power. The storage cell 12 is chargeable, not only with power supplied from the power grid or the solar cell 11, but also with power supplied from the power generation apparatus 33.

The power control apparatus 20 converts DC power supplied from the solar cell 11 and the storage cell 12 and AC power supplied from the power grid and the power generation apparatus 33, and also controls the switching between interconnected operation and independent operation. The power control apparatus 20 includes an inverter 21, interconnected operation switches 22 and 23, an independent operation switch 24, and a controller 25 that controls the overall power control apparatus 20. The interconnected operation switch 23 may be located outside the power control apparatus 20.

The inverter 21 is a bidirectional inverter. The inverter 21 converts DC power supplied from the solar cell 11 and the storage cell 12 into AC power. The inverter 21 also converts AC power supplied from the power grid and the power generation apparatus 33 into DC power. A converter for stepping up the DC power from the solar cell 11 and the storage cell 12 to a predetermined voltage may be provided at a stage preceding the inverter 21.

The interconnected operation switches 22 and 23 and the independent operation switch 24 are each configured as a relay, a transistor, or the like, and controlled to be ON or OFF. The independent operation switch 24 is located between the power generation apparatus 33 and the storage cell 12, as illustrated in the drawing. The interconnected operation switches 22 and 23 and the independent operation switch 24 are switched synchronously so that both the interconnected operation switches 22 and 23 and the independent operation switch 24 are not ON (or OFF) at the same time. In more detail, when the interconnected operation switches 22 and 23 are ON, the independent operation switch 24 is OFF at the same time, and the power control apparatus 20 performs interconnected operation. When the interconnected operation switches 22 and 23 are OFF, the independent operation switch 24 is ON at the same time, and the power control apparatus 20 performs independent operation. The synchronous control of the interconnected operation switches 22 and 23 and the independent operation switch 24 is realized in hardware by branching the control signal wiring for the interconnected operation switches 22 and 23 to the independent operation switch 24. Here, it will be understood that the ON/OFF state for each switch in respect of the same control signal may be set independently. Alternatively, the synchronous control of the interconnected operation switches 22 and 23 and the independent operation switch 24 may be realized in software by the controller 25.

The controller 25 includes, for example, a microcomputer. The controller 25 controls the operation of each of the inverter 21, the interconnected operation switches 22 and 23, the independent operation switch 24, etc. on the basis of the states of a grid voltage increase, a power failure, and the like. During interconnected operation, the controller 25 turns the interconnected operation switches 22 and 23 ON, and the independent operation switch 24 OFF. During independent operation, the controller 25 turns the interconnected operation switches 22 and 23 OFF, and the independent operation switch 24 ON.

The distribution board 31 separates the power supplied from the power grid during interconnected operation into a plurality of branches, and distributes the power to the load 32. The distribution board 31 also separates the power supplied from the plurality of distributed power sources (solar cell 11, storage cell 12, power generation apparatus 33) into a plurality of branches, and distributes the power to the load 32. The load 32 is an electric power load that consumes power. Examples of the load 32 include various electric products for home use such as air conditioners, microwaves, and televisions, and machines, lighting systems, etc. for use in industrial and commercial installations such as air conditioners and lighting fixtures.

The power generation apparatus 33 includes a fuel cell or a gas power generator. The fuel cell includes a cell that generates DC power using hydrogen through a chemical reaction with oxygen in the air, an inverter that converts the generated DC power into AC power of 100 V or 200 V, and other auxiliary equipment. The fuel cell as the power generation apparatus 33 is a system configured to supply AC power to the load 32 without involving the power control apparatus 20, and may be a general purpose system that is not necessarily designed to connect to the power control apparatus 20. The gas power generator generates power by a gas engine that uses a predetermined gas or the like as fuel.

The power generation apparatus 33 generates power while the corresponding current sensor 40 detects current flowing in a first direction. When generating power, the power generation apparatus 33 performs a load-following operation to follow the power consumption of the load 32 or a rated operation at predetermined rated power. The current flowing in the first direction is not limited, but is, for example, current flowing in a direction in which the consumer facility purchases power, and corresponds to forward power flow. For example, the following range in the load-following operation is 200 W to 700 W, and the rated power in the rated operation is 700 W. The power generation apparatus 33 may perform the load-following operation to follow the power consumption of the load 32 during interconnected operation, and perform the load-following operation or the rated operation at rated power during independent operation.

The current sensor 40 detects the current flowing between the power grid and the power generation apparatus 33. For example, in the case in which it is stipulated that the power generated by the power generation apparatus 33 is contractually non-sellable, when the current sensor 40 detects current flowing in a second direction toward the power grid, the power generation apparatus 33 stops generating power. The current flowing in the second direction is not limited, but is, for example, current flowing in a direction in which the consumer facility sells power to the power grid, and corresponds to reverse power flow. While the current sensor 40 detects forward power flow, the power generation apparatus 33 generates power in the load-following operation or the rated operation on the assumption that the power generation apparatus 33 can supply power to the load 32.

According to the power control system of this embodiment, in a state in which the power generation apparatus 33 and the storage cell 12 are paralleled off from the power grid, a dummy current flows in the same direction as forward power flow to the current sensor 40 through the dummy output unit 50. This causes the power generation apparatus 33 to perform rated operation, so that the power generated by the power generation apparatus 33 can be stored in the storage cell 12. Alternatively, in the case in which the power generation apparatus 33 starts power generation in the above-mentioned state, the power generation apparatus 33 may draw power from the storage cell 12 instead of from the power grid. Once the power generation has become stable, the power generation apparatus 33 may continue the power generation using part of the power generated by the power generation apparatus 33 itself. The operation of the dummy output unit 50 during independent operation and interconnected operation is described in detail below.

Figure 2:
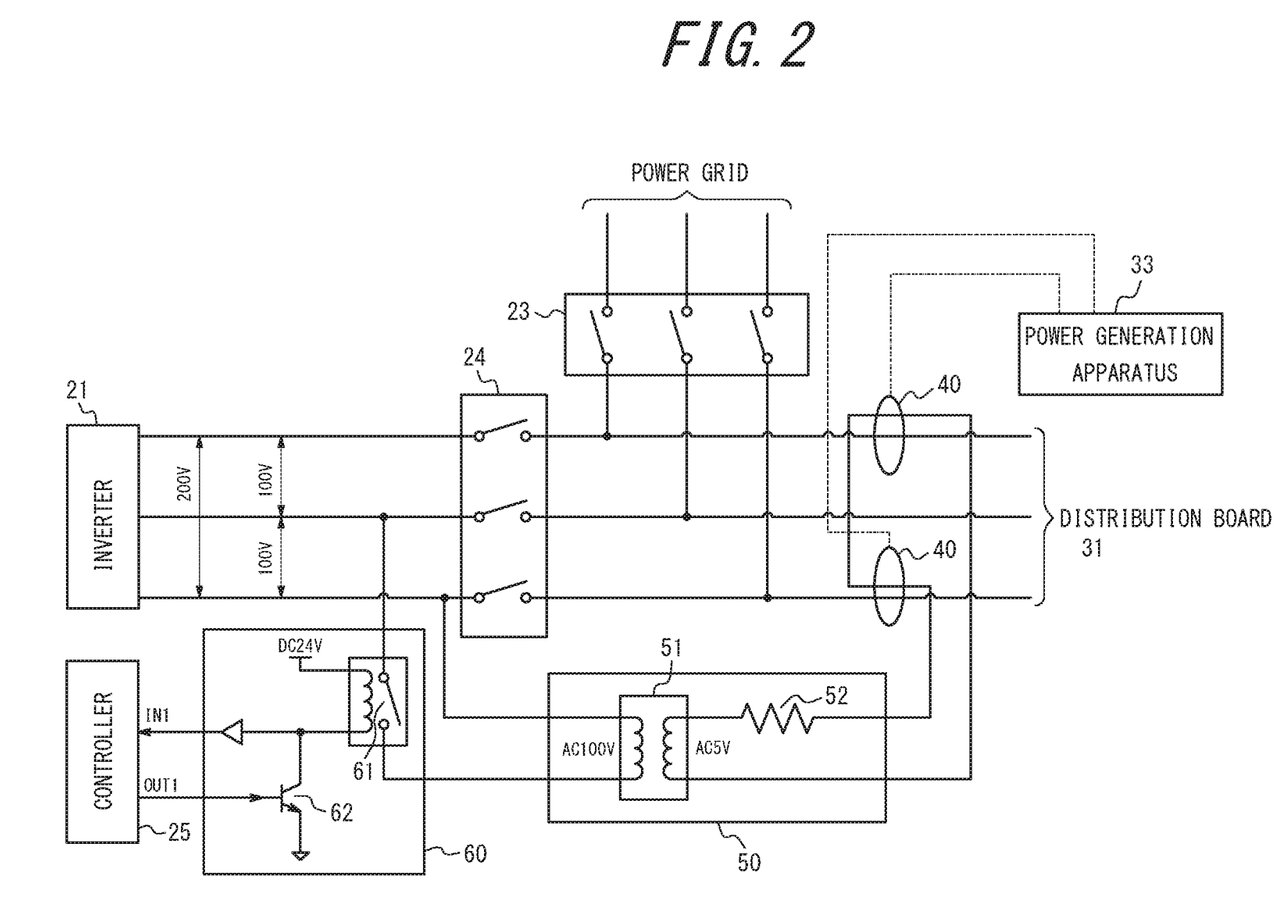
FIG. 2 is a diagram illustrating wiring relating to a dummy output unit and a relay unit in the power control system according to Embodiment 1 of the present disclosure.

The dummy output unit 50 is configured to supply the dummy current, which is a current in the same direction as forward power flow, to the current sensor 40 during independent operation. In normal operation, the dummy output unit 50 does not supply the dummy current during interconnected operation. FIG. 2 is a diagram illustrating wiring relating to the dummy output unit 50 and the relay unit 60 in the power control system according to Embodiment 1. The dummy output unit 50 includes a transformer 51 and a dummy current load 52. FIG. 2 illustrates an example in which the power grid is a single-phase three-wire supply at 200 V. In this case, the dummy output unit 50 is wired between the inverter 21 and the independent operation switch 24 via the relay unit 60, and receives power from the power control apparatus 20. One voltage line and a neutral line are connected to the dummy output unit 50. The relay unit 60 is located between the point of connection with the neutral line and the dummy output unit 50. The dummy output unit 50 is wired so that its output passes through the current sensor 40 provided in each of the two voltage lines. The dummy output unit 50 may be independent of the power control apparatus 20, or integral with the power control apparatus 20. In FIG. 2, the dummy output unit 50 is independent of the power control apparatus 20.

The transformer 51 steps down the voltage from the power control apparatus 20, to an optimum value. In FIG. 2, for example, the transformer 51 steps down an AC voltage of 100 V supplied from the power control apparatus 20, to an AC voltage of 5 V. The voltage of the dummy current may be set as appropriate. For example, the voltage of the dummy current may be set to be greater than 0 V and not greater than 10 V. The dummy current load 52 is a load provided as appropriate for current adjustment in the dummy output unit 50. The dummy current load 52 may be a load outside the dummy output unit 50.

The relay unit 60 includes a relay 61 and a field effect transistor (FET) 62. In normal operation, the relay 61 is ON during independent operation, and causes the current supplied from the power control apparatus 20 to flow to the dummy output unit 50. In this case, the dummy output unit 50 supplies the dummy current to the current sensor 40 via the transformer 51 and the dummy current load 52. The current sensor 40 detects the dummy current, so that the power generation apparatus 33 can generate power. Thus, even during independent operation, the storage cell 12 can be charged with the power generated by the power generation apparatus 33.

In normal operation, the relay 61 is OFF during interconnected operation, and so no current is supplied from the power control apparatus 20 to the dummy output unit 50. In this case, the dummy output unit 50 does not supply the dummy current to the current sensor 40, and the current sensor 40 does not detect the dummy current.

The gate terminal of the FET 62 is connected to OUT1 of the controller 25. One of the other two terminals (source terminal and drain terminal) is grounded, and the other is connected between the relay 61 and IN1 of the controller 25. The FET 62 is turned ON, upon receiving a high (H) output signal at its gate terminal from OUT1 of the controller 25. At this time, the controller 25 detects a low (L) input signal at IN1, and the relay 61 is turned ON. Thus, the controller 25 outputs a high signal from OUT1, to cause the relay 61 to be ON during independent operation. The FET 62 is turned OFF, upon receiving a low output signal at its gate terminal from OUT1 of the controller 25. At this time, the controller 25 detects a high input signal at IN1, and the relay 61 is turned OFF. Thus, the controller 25 outputs a low signal from OUT1, to cause the relay 61 to be OFF during interconnected operation. The control by the controller 25 on the basis of the output state (set output value) of OUT1 and the detection state (detection value) of IN1 in the controller 25 is described in detail below.

Figure 3:
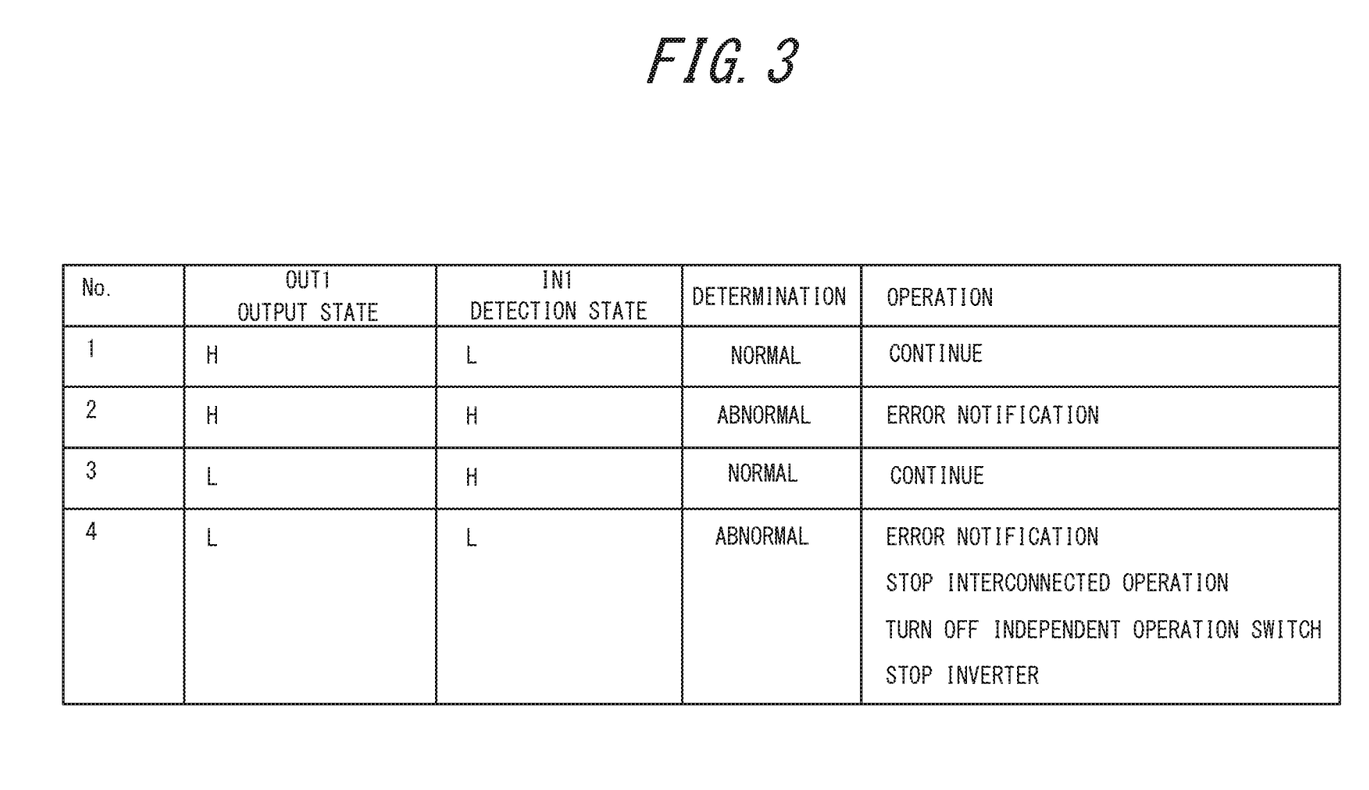
FIG. 3 is a table illustrating the operations of a controller in the power control system according to Embodiment 1 of the present disclosure.

FIG. 3 is a table illustrating the dummy current supply state and the operation of the controller 25 in each state on the basis of the output state of OUT1 and the detection state of IN1 in the controller 25 in Embodiment 1. No. 1 and No. 2 correspond to states in which a high signal is output from OUT1 in the controller 25, i.e. the state during independent operation. No. 3 and No. 4 correspond to states in which a low signal is output from OUT1 in the controller 25, i.e. the state during interconnected operation. The controller 25 determines whether the dummy current supply state is normal on the basis of the output state of OUT1 and the detection state from the relay unit 60.

No. 1 is the state in which a high signal is output from OUT1 and a low signal is detected at IN1 in the controller 25. In such a case, the FET 62 is ON as normal, and the relay 61 is ON. Hence, the dummy output unit 50 can supply the dummy current to the current sensor 40 as normal, during independent operation. In the above-mentioned state, the controller 25 determines that the supply state in which the dummy current is supplied by the dummy output unit 50 is normal during independent operation. In this case, the controller 25 performs control to continue the operation of the dummy output unit 50.

No. 2 is the state in which a high signal is output from OUT1 and a high signal is detected at IN1 in the controller 25. In such a case, the FET 62 is not ON as normal for some reason, and the relay 61 is OFF. Hence, the dummy output unit 50 cannot supply the dummy current to the current sensor 40, despite independent operation. In the above-mentioned state, the controller 25 determines that the supply state in which the dummy current is not supplied by the dummy output unit 50 during independent operation is abnormal. In this case, the controller 25 performs error notification. A first reason why the controller 25 performs error notification is simply that, in this error state, because the dummy current is not supplied from the dummy output unit 50 during independent operation, no reverse power flow of the power generated by the power generation apparatus 33 to the power grid will occur. Accordingly, the controller 25 can safely perform control to continue the operation of the dummy output unit 50. Second, since this occurs during independent operation, a power supply source as a substitute for the power grid is necessary, and therefore the controller 25 needs to perform control to continue the operation of the independent operation system including the solar cell 11, the storage cell 12, and the inverter 21. Thus, the power control apparatus 20 can stably supply power to the load 32 even during independent operation.

No. 3 is the state in which a low signal is output from OUT1 and a high signal is detected at IN1 in the controller 25. In such a case, the FET 62 is OFF as normal, and the relay 61 is OFF. Hence, the dummy output unit 50 does not supply the dummy current to the current sensor 40 during interconnected operation. In the above-mentioned state, the controller 25 determines that the supply state in which the dummy current is not supplied by the dummy output unit 50 is normal during interconnected operation. In this case, the controller 25 performs control to continue the operation of the dummy output unit 50.

No. 4 is the state in which a low signal is output from OUT1 and a low signal is detected at IN1 in the controller 25. In such a case, the FET 62 is not OFF as normal for some reason such as short-circuit damage, and the relay 61 is ON. Hence, the dummy output unit 50 supplies the dummy current to the current sensor 40, despite interconnected operation. In the above-mentioned state, the controller 25 determines that the supply state in which the dummy current is supplied by the dummy output unit 50 during interconnected operation is abnormal. In this case, the controller 25 performs error notification, stops the interconnected operation, turns off the independent operation switch 24, or stops the inverter 21. The controller 25 thus performs control not to continue the operation of the dummy output unit 50. The reason why the controller 25 performs these operations is that if the above-mentioned state occurs when interconnected with the power grid, there is a possibility of reverse power flow of the power generated by the power generation apparatus 33 to the power grid. In other words, according to these operations, the dummy output unit 50 is kept from supplying the dummy current, so that reverse power flow of the power generated by the power generation apparatus 33 to the power grid can be prevented.

Figure 4:
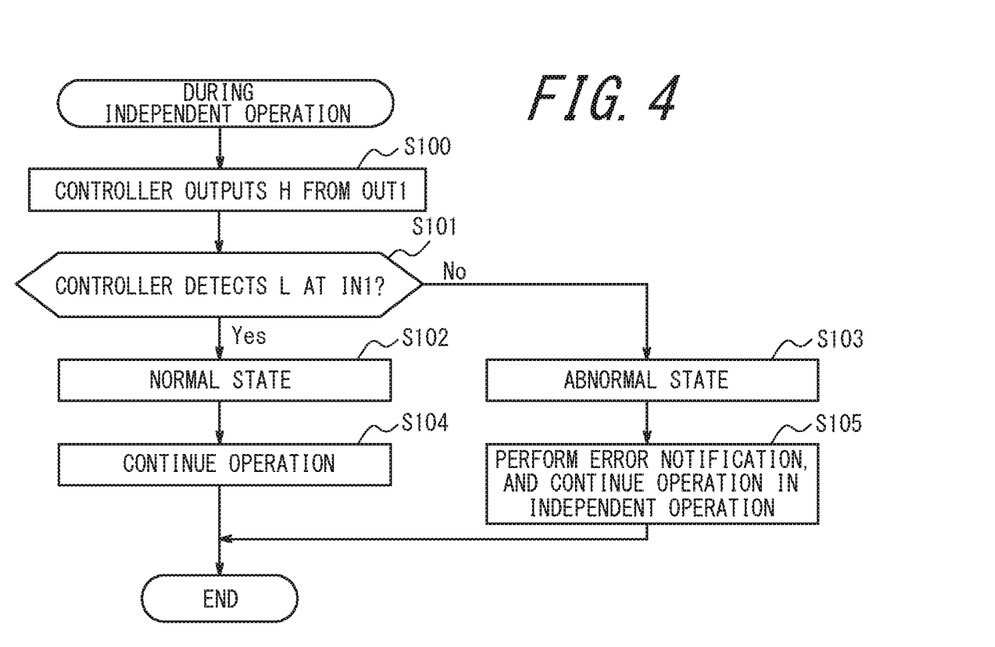
FIG. 4 is a flowchart illustrating the operation of the controller in the power control system according to Embodiment 1 of the present disclosure during independent operation.
Figure 5:
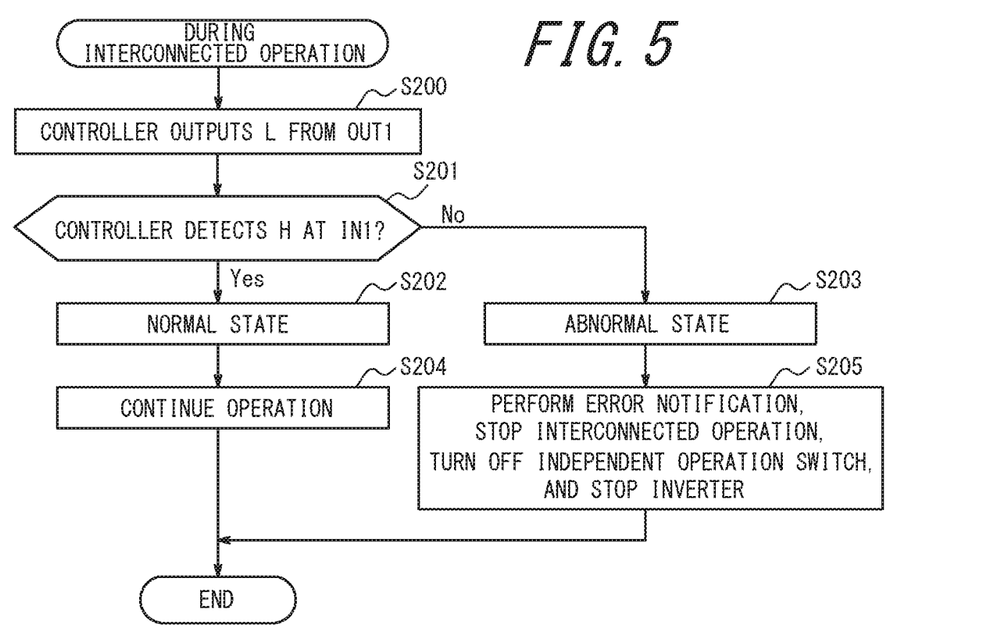
FIG. 5 is a flowchart illustrating the operation of the controller in the power control system according to Embodiment 1 of the present disclosure during interconnected operation.

The operation of the power control system according to Embodiment 1 of the present disclosure is described below, with reference to flowcharts in FIGS. 4 and 5. The operation of the power control system during independent operation differs to that during interconnected operation. The operation during independent operation is described below, with reference to FIG. 4.

First, the controller 25 outputs a high signal from OUT1 (step S100).

The controller 25 then determines whether a low signal from the relay unit 60 is detected at IN1 (step S101). In the case in which a low signal is detected, the controller 25 proceeds to step S102. In the case in which a low signal is not detected, i.e. in the case in which a high signal from the relay unit 60 is detected at IN1, the controller 25 proceeds to step S103.

Based on a low signal from the relay unit 60 detected at IN1, the controller 25 determines that the supply state of supplying the dummy current by the dummy output unit 50 is normal (step S102).

Following this, the controller 25 performs control to continue the operation of the dummy output unit 50 on the basis of the determination that the supply state is normal (step S104). The controller 25 then ends control.

Based on a high signal from the relay unit 60 detected at IN1, the controller 25 determines that the supply state of not supplying the dummy current by the dummy output unit 50 is abnormal (step S103).

Following this, the controller 25 performs error notification on the basis of the determination that the supply state is abnormal (step S105). In this case, the controller 25 performs error notification, and performs control to continue the operation of the dummy output unit 50 and the operation of the independent operation system including the solar cell 11, the storage cell 12, and the inverter 21, as mentioned above. The controller 25 then ends control.

The operation during interconnected operation is described below, with reference to FIG. 5. During interconnected operation, the controller 25 outputs a low signal from OUT1 (step S200).

The controller 25 then determines whether a high signal from the relay unit 60 is detected at IN1 (step S201). In the case in which a high signal is detected, the controller 25 proceeds to step S202. In the case in which a high signal is not detected, i.e. in the case in which a low signal from the relay unit 60 is detected at IN1, the controller 25 proceeds to step S203.

Based on a high signal from the relay unit 60 detected at IN1, the controller 25 determines that the supply state of not supplying the dummy current by the dummy output unit 50 is normal (step S202).

Following this, the controller 25 performs control to continue the operation of the dummy output unit 50 on the basis of the determination that the supply state is normal (step S204). The controller 25 then ends control.

Based on a low signal from the relay unit 60 detected at IN1, the controller 25 determines that the supply state of supplying the dummy current by the dummy output unit 50 is abnormal (step S203).

Following this, the controller 25 performs error notification, stops interconnected operation, turns off the independent operation switch 24, and stops the inverter 21 on the basis of the determination that the supply state is abnormal (step S205). In other words, the controller 25 performs control not to continue the operation of the dummy output unit 50. Thus, the dummy output unit 50 is kept from supplying the dummy current, so that reverse power flow of the power generated by the power generation apparatus 33 to the power grid can be prevented. The controller 25 then ends control.

With the power control system according to Embodiment 1 having the structure described above, the controller 25 can determine whether the dummy current supply state is normal during independent operation and during interconnected operation, and control whether to continue the operation of the dummy output unit 50.

During independent operation, in the case in which the dummy current supply state is normal, the dummy output unit 50 can stably continue supplying the dummy current, so that the power generation by the power generation apparatus 33 can be continued.

During independent operation, in the case in which the dummy current supply state is abnormal, the controller 25 performs error notification. The controller 25 also continues the operation of the independent operation system. Thus, the power control apparatus 20 can stably supply power to the load 32 even during independent operation.

During interconnected operation, in the case in which the dummy current supply state is normal, the dummy output unit 50 does not supply the dummy current, and continues the operation. Thus, the power control system according to Embodiment 1 can prevent reverse power flow of the power generated by the power generation apparatus 33 to the power grid, by the functioning of the current sensor 40 itself.

During interconnected operation, in the case in which the dummy current supply state is abnormal, the controller 25 performs error notification, stops interconnected operation, turns off the independent operation switch 24, and stops the inverter 21. Thus, the dummy output unit 50 does not continue its operation, and the supply of the dummy current is stopped. According to these operations, the power control system according to Embodiment 1 can prevent reverse power flow of the power generated by the power generation apparatus 33 to the power grid.

Embodiment 2

A power control system according to Embodiment 2 of the present disclosure is described below. Embodiment 2 differs from Embodiment 1 in respect of the method for determining whether the dummy current supply state is normal. Embodiment 2 is described below, mainly focusing on the differences with respect to Embodiment 1. Parts having the same function and structure as those in Embodiment 1 are given the same reference signs, and their descriptions are omitted.

Figure 6:
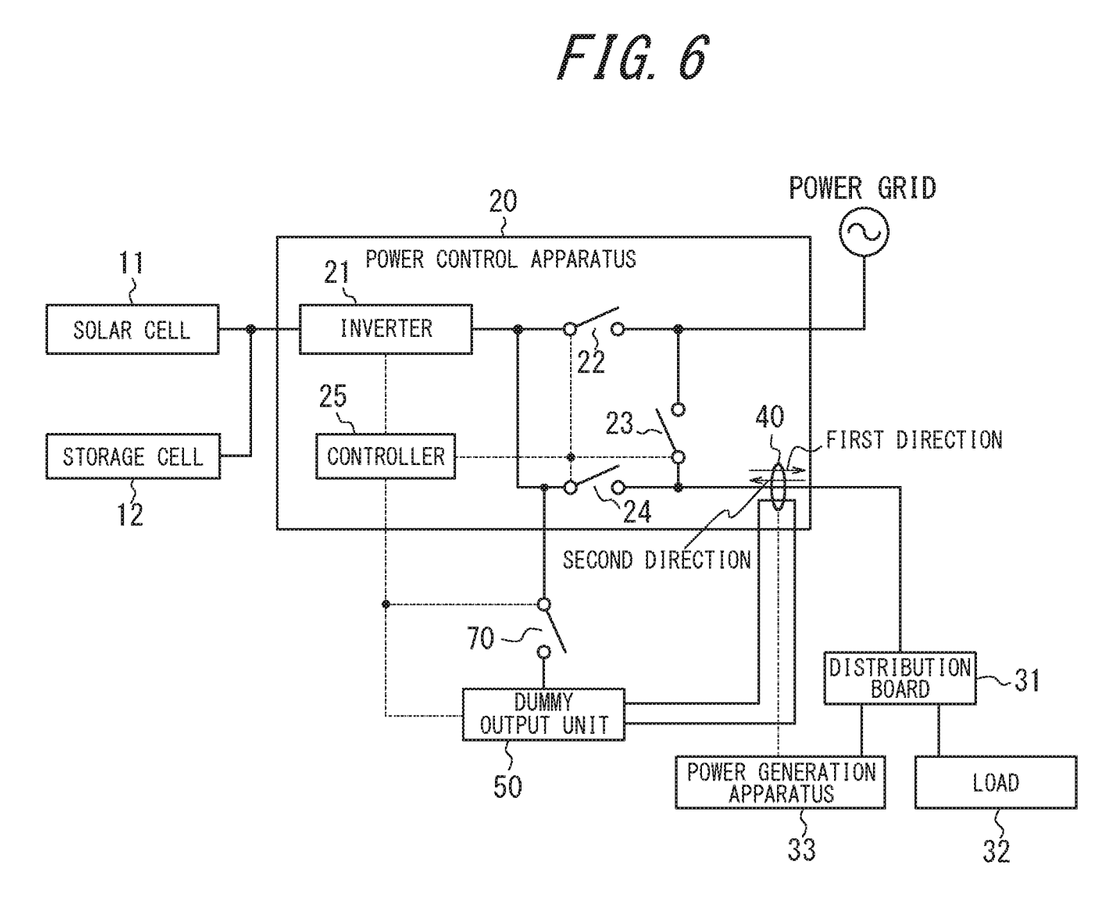
FIG. 6 is a block diagram of a power control system according to Embodiment 2 of the present disclosure.

FIG. 6 is a block diagram illustrating the schematic structure of the power control system according to Embodiment 2 of the present disclosure. The power control system according to Embodiment 2 of the present disclosure includes a relay 70, instead of the relay unit 60.

Figure 7:
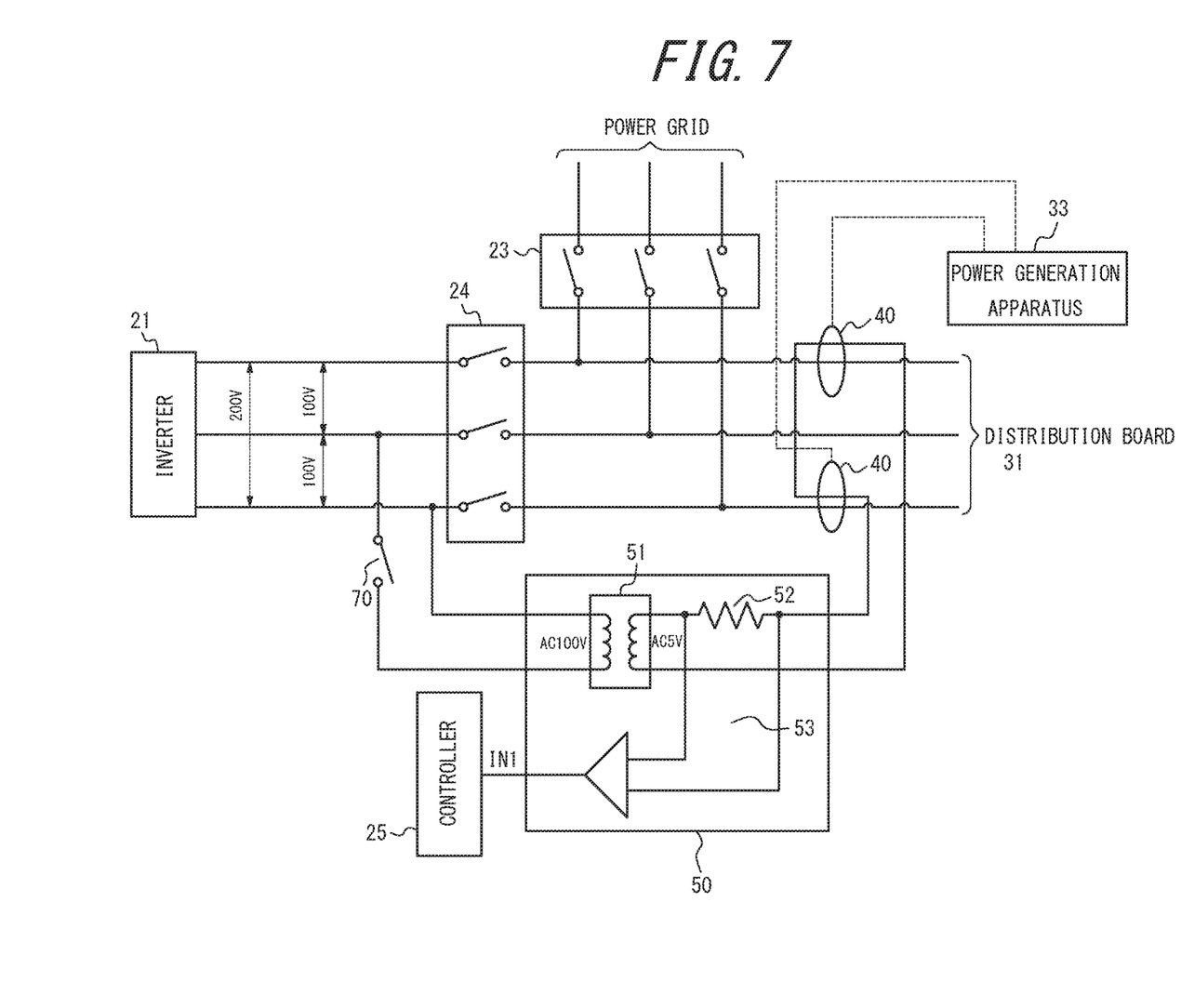
FIG. 7 is a diagram illustrating wiring relating to a dummy output unit including a voltage sensor and a relay in the power control system according to Embodiment 2 of the present disclosure.
Figure 8:
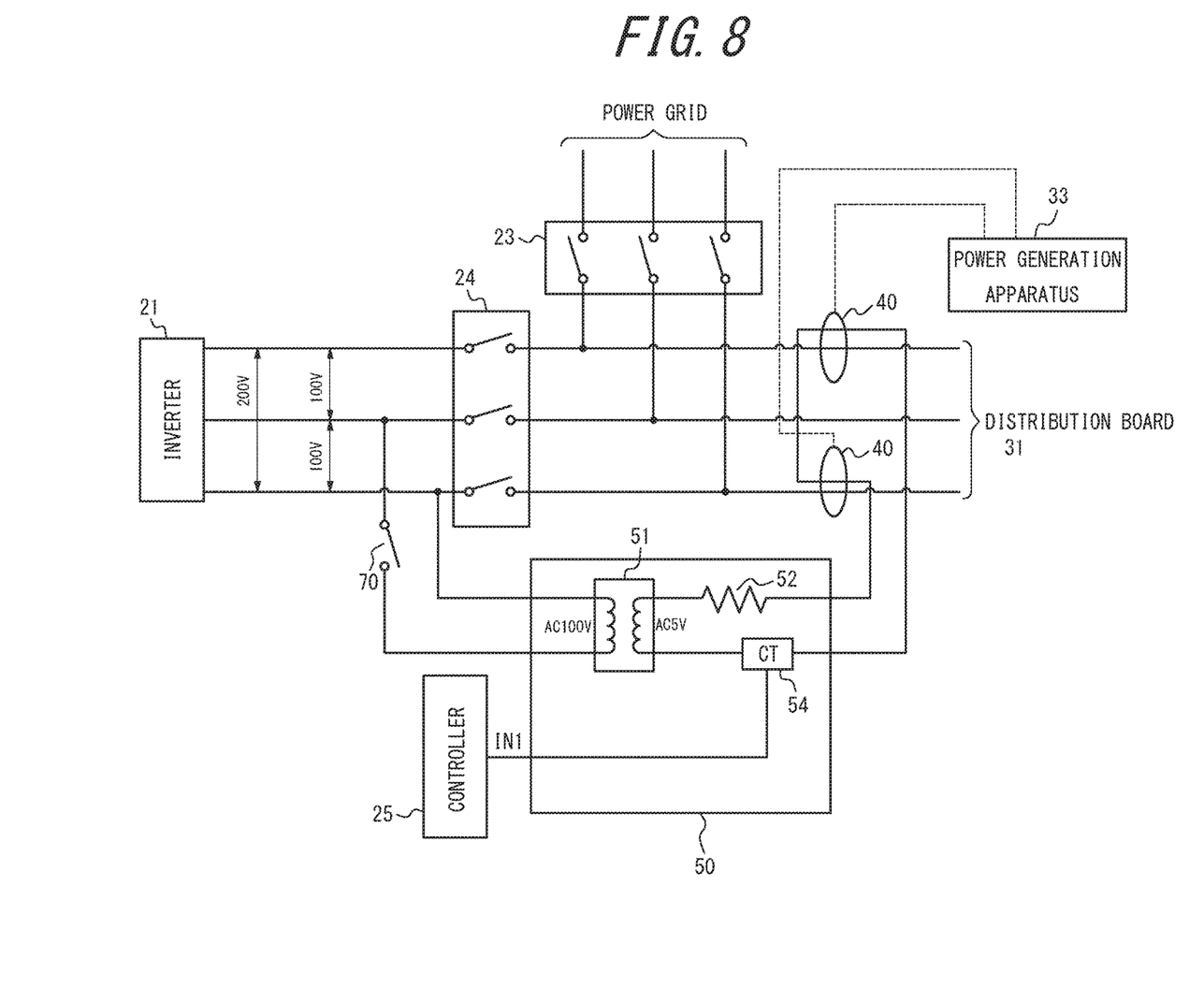
FIG. 8 is a diagram illustrating wiring relating to a dummy output unit including a current sensor and a relay in the power control system according to Embodiment 2 of the present disclosure.

FIGS. 7 and 8 are diagrams illustrating wiring relating to the dummy output unit 50 and the relay 70 in the power control system according to Embodiment 2. In FIGS. 7 and 8, the power grid is in a single-phase three-wire supply at 200 V, as in FIG. 2. In this case, the dummy output unit 50 is wired between the inverter 21 and the independent operation switch 24 via the relay 70, and receives power from the power control apparatus 20. One voltage line and a neutral line are connected to the dummy output unit 50. The relay 70 is located between the point of connection with the neutral line and the dummy output unit 50.

The dummy output unit 50 in the power control system according to Embodiment 2 further includes a voltage sensor 53 (FIG. 7) or a current sensor 54 (FIG. 8) for measuring its output. The output of the voltage sensor 53 or the current sensor 54 is connected to IN1 of the controller 25.

As illustrated in FIG. 7, the voltage sensor 53 measures the voltage difference between both ends of the dummy current load 52. The resulting measurement signal is fed to IN1 of the controller 25. The controller 25 determines whether the dummy output unit 50 supplies the dummy current on the basis of the measurement signal.

As illustrated in FIG. 8, the current sensor 54 is located between the transformer 51 and the current sensor 40, and measures the current value. The resulting measurement signal is fed to IN1 of the controller 25. The controller 25 determines whether the dummy output unit 50 supplies the dummy current on the basis of the measurement signal.

The control by the controller 25 on the basis of the state of the power control system according to Embodiment 2 and the output value of the voltage sensor 53 or the current sensor 54 is described in detail below.

Figure 9:
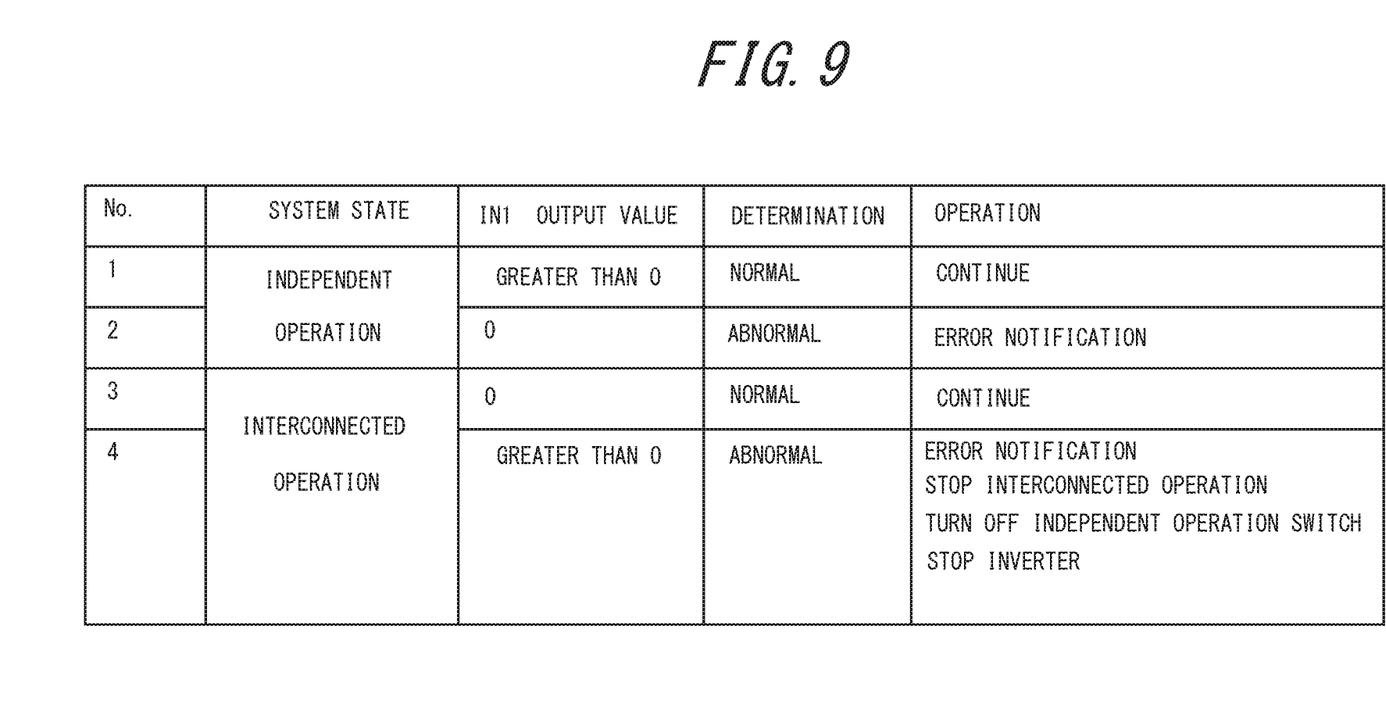
FIG. 9 is a table illustrating the operations of a controller in the power control system according to Embodiment 2 of the present disclosure.

FIG. 9 is a table illustrating the dummy current supply state and the operation of the controller 25 in each state on the basis of the state of the power control system according to Embodiment 2 and the output value of the voltage sensor 53 or the current sensor 54 in Embodiment 2. No. 1 and No. 2 correspond to states during independent operation. No. 3 and No. 4 correspond to states during interconnected operation. The controller 25 determines whether the dummy current supply state is normal on the basis of the output value of the voltage sensor 53 or the current sensor 54.

No. 1 is the state in which an output value greater than 0 from the voltage sensor 53 or the current sensor 54 is detected at IN1 during independent operation. In such a case, the relay 70 is ON as normal. Hence, the dummy output unit 50 can supply the dummy current to the current sensor 40 as normal, during independent operation. In the above-mentioned state, the controller 25 determines that the supply state in which the dummy current is supplied by the dummy output unit 50 is normal during independent operation. In this case, the controller 25 performs control to continue the operation of the dummy output unit 50.

No. 2 is the state in which an output value of 0 from the voltage sensor 53 or the current sensor 54 is detected at IN1 during independent operation. In such a case, the relay 70 is not ON as normal, for some reason. Hence, the dummy output unit 50 cannot supply the dummy current to the current sensor 40, despite independent operation. In the above-mentioned state, the controller 25 determines that the supply state in which the dummy current is not supplied by the dummy output unit 50 during independent operation is abnormal. In this case, the controller 25 performs only error notification. A first reason why the controller 25 performs only error notification is simply that, in this error state, because the dummy current is not supplied from the dummy output unit 50 independent operation, no reverse power flow of the power generated by the power generation apparatus 33 to the power grid will occur. Accordingly, the controller 25 can safely perform control to continue the operation of the dummy output unit 50. Second, since this occurs during independent operation, a power supply source as a substitute for the power grid is necessary, and therefore the controller 25 needs to perform control to continue the operation of the independent operation system including the solar cell 11, the storage cell 12, and the inverter 21. Thus, the power control apparatus 20 can stably supply power to the load 32 even during independent operation.

No. 3 is the state in which an output value of 0 from the voltage sensor 53 or the current sensor 54 is detected at IN1 during interconnected operation. In such a case, the relay 70 is OFF as normal. Hence, the dummy output unit 50 does not supply the dummy current to the current sensor 40 during interconnected operation. In the above-mentioned state, the controller 25 determines that the supply state in which the dummy current is not supplied by the dummy output unit 50 is normal during interconnected operation. In this case, the controller 25 performs control to continue the operation of the dummy output unit 50.

No. 4 is the state in which an output value greater than 0 from the voltage sensor 53 or the current sensor 54 is detected at IN1 during interconnected operation. In such a case, the relay 70 is not OFF as normal, for some reason such as short-circuit damage. Hence, the dummy output unit 50 supplies the dummy current to the current sensor 40, despite interconnected operation. In the above-mentioned state, the controller 25 determines that the supply state in which the dummy current is supplied by the dummy output unit 50 during interconnected operation is abnormal. In this case, the controller 25 performs error notification, stops the interconnected operation, turns off the independent operation switch 24, and stops the inverter 21. The controller 25 thus performs control not to continue the operation of the dummy output unit 50. The reason why the controller 25 performs these operations is that if the above-mentioned state occurs when interconnected with the power grid, there is a possibility of reverse power flow of the power generated by the power generation apparatus 33 to the power grid. In other words, according to these operations, the dummy output unit 50 is kept from supplying the dummy current, so that reverse power flow of the power generated by the power generation apparatus 33 to the power grid can be prevented.

Figure 10:
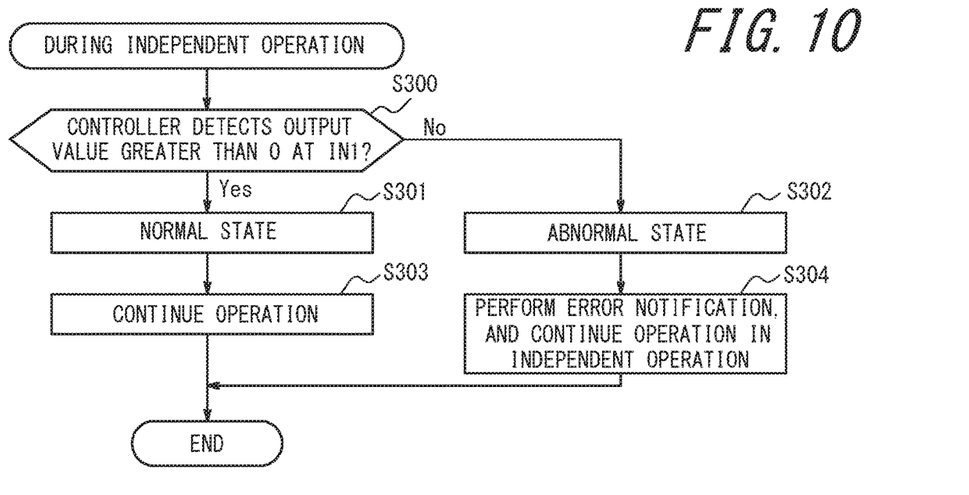
FIG. 10 is a flowchart illustrating the operation of the controller in the power control system according to Embodiment 2 of the present disclosure during independent operation.
Figure 11:
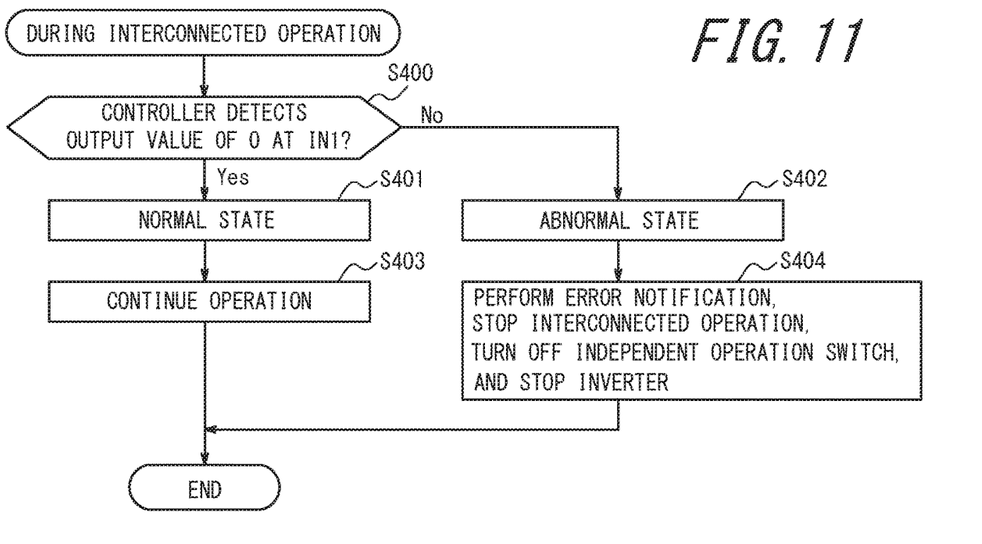
FIG. 11 is a flowchart illustrating the operation of the controller in the power control system according to Embodiment 2 of the present disclosure during interconnected operation.

The operation of the power control system according to Embodiment 2 of the present disclosure is described below, with reference to flowcharts in FIGS. 10 and 11. The operation of the power control system during independent operation differs to that during interconnected operation. The operation during independent operation is described below, with reference to FIG. 10.

First, the controller 25 determines whether an output value greater than 0 is detected at IN1 (step S300). In the case in which an output value greater than 0 is detected, the controller 25 proceeds to step S301. In the case in which an output value greater than 0 is not detected, i.e. in the case in which an output value of 0 from the voltage sensor 53 or the current sensor 54 is detected at IN1, the controller 25 proceeds to step S302.

Based on an output value greater than 0 from the voltage sensor 53 or the current sensor 54 detected at IN1, the controller 25 determines that the supply state of supplying the dummy current by the dummy output unit 50 is normal (step S301).

Following this, the controller 25 performs control to continue the operation of the dummy output unit 50 on the basis of the determination that the supply state is normal (step S303). The controller 25 then ends control.

Based on an output value of 0 from the voltage sensor 53 or the current sensor 54 detected at IN1, the controller 25 determines that the supply state of not supplying the dummy current by the dummy output unit 50 is abnormal (step S302).

Following this, the controller 25 performs error notification on the basis of the determination that the supply state is abnormal (step S304). In this case, the controller 25 performs error notification, and performs control to continue the operation of the dummy output unit 50 and the operation of the independent operation system including the solar cell 11, the storage cell 12, and the inverter 21. The controller 25 then ends control.

The operation during interconnected operation is described below, with reference to FIG. 11. During interconnected operation, the controller 25 determines whether an output value of 0 is detected at IN1 (step S400). In the case in which an output value of 0 is detected, the controller 25 proceeds to step S401. In the case in which an output value of 0 is not detected, i.e. in the case in which an output value greater than 0 from the voltage sensor 53 or the current sensor 54 is detected at IN1, the controller 25 proceeds to step S402.

Based on an output value of 0 from the voltage sensor 53 or the current sensor 54 detected at IN1, the controller 25 determines that the supply state of not supplying the dummy current by the dummy output unit 50 is normal (step S401).

Following this, the controller 25 performs control to continue the operation of the dummy output unit 50 on the basis of the determination that the supply state is normal (step S403). The controller 25 then ends control.

Based on an output value greater than 0 from the voltage sensor 53 or the current sensor 54 detected at IN1, the controller 25 determines that the supply state of supplying the dummy current by the dummy output unit 50 is abnormal (step S402).

Following this, the controller 25 performs error notification, stops interconnected operation, turns off the independent operation switch 24, and stops the inverter 21 on the basis of the determination that the supply state is abnormal (step S404). In other words, the controller 25 performs control not to continue the operation of the dummy output unit 50. Thus, the dummy output unit 50 is kept from supplying the dummy current, so that reverse power flow of the power generated by the power generation apparatus 33 to the power grid can be prevented. The controller 25 then ends control.

With the power control system according to Embodiment 2 described above, the controller 25 can determine whether the dummy current supply state is normal during independent operation and during interconnected operation, and control whether to continue the operation of the dummy output unit 50, as with the power control system according to Embodiment 1.

During independent operation, in the case in which the dummy current supply state is normal, the dummy output unit 50 can stably continue supplying the dummy current, so that the power generation by the power generation apparatus 33 can be continued.

During independent operation, in the case in which the dummy current supply state is abnormal, the controller 25 performs error notification. The controller 25 also continues the operation of the independent operation system. Thus, the power control apparatus 20 can stably supply power to the load 32 even during independent operation.

During interconnected operation, in the case in which the dummy current supply state is normal, the dummy output unit 50 does not supply the dummy current, and continues the operation. Thus, the power control system according to Embodiment 1 can prevent reverse power flow of the power generated by the power generation apparatus 33 to the power grid, by the functioning of the current sensor 40 itself.

During interconnected operation, in the case in which the dummy current supply state is abnormal, the controller 25 performs error notification, stops interconnected operation, turns off the independent operation switch 24, and stops the inverter 21. Thus, the dummy output unit 50 does not continue its operation, and the supply of the dummy current is stopped. According to these operations, the power control system according to Embodiment 2 can prevent reverse power flow of the power generated by the power generation apparatus 33 to the power grid.

In FIGS. 1 and 6, the current sensor 40 may be located in the power control apparatus 20 at such a position where current resulting from the power generation of the power generation apparatus 33 does not flow during independent operation, for example, between the power grid and the interconnected operation switch 23. This is because, if the current sensor 40 is located at a position where current resulting from the power generation of the power generation apparatus 33 flows, dummy current for causing the power generation apparatus 33 to generate power needs to be output with power exceeding the current resulting from the power generation, and consequently power consumption associated with dummy current increases. By locating the current sensor 40 in the power control apparatus 20 at such a position where current resulting from the power generation of the power generation apparatus 33 does not flow during independent operation, power consumption associated with dummy current can be reduced.

It is to be understood by a person of ordinary skill in the art that the disclosed technique may also be realized in specific forms other than the foregoing embodiments without departing from the technical spirit or essential features of the present disclosure. Therefore, the above description is illustrative and not restrictive. The scope of the present disclosure is defined by the accompanying claims rather than by the above description. Amongst all modifications, those falling within the corresponding equivalent scope are encompassed within the scope of the present disclosure.

The invention claimed is:

1. A power control system, comprising:

a power control apparatus;

a relay unit including a relay to which a dummy current supplied from the power control apparatus is input;

an output from a dummy circuit configured to supply the dummy current to a first current sensor by turning on the relay during independent operation, and not supply the dummy current to the first current sensor by turning off the relay during interconnected operation, the dummy current corresponding to forward power flow; and a controller configured to determine whether a supply state of the dummy current is normal, and control whether to continue operation of the output from the dummy circuit;

wherein the relay is configured to be on during the independent operation and off during the interconnected operation in a state in which the supply state is normal, wherein the controller is configured to determine whether the supply state is normal on the basis of a set output value to the relay unit and a detection value from the relay unit, and wherein the controller is configured to output a low signal as the set output value during the interconnected operation, and in a case in which the detection value is a high signal, determine that the supply state is normal, and continue the operation of the output from the dummy circuit.

2. The power control system according to claim 1, wherein the controller is configured to output a high signal as the set output value during the independent operation, and, in a case in which the detection value is a low signal, determine that the supply state is normal, and continue the operation of the output from the dummy circuit.

3. The power control system according to claim 1, further comprising a voltage sensor or a second current sensor configured to measure an output value of the output from the dummy circuit, and the controller is configured to determine whether the supply state is normal on the basis of the output value.

4. The power control system according to claim 3, wherein the controller is configured to, during the independent operation, determine that the supply state is not normal in a case in which the output value is 0, and determine that the supply state is normal in a case in which the output value is greater than 0.

5. The power control system according to claim 3, wherein the controller is configured to, during the interconnected operation, determine that the supply state is normal in a case in which the output value is 0, and determine that the supply state is not normal in a case in which the output value is greater than 0.

6. A power control system, comprising:

a power control apparatus;

a relay unit including a relay to which a dummy current supplied from the power control apparatus is input;

an output from a dummy circuit configured to
  supply the dummy current to a first current sensor by turning on the relay during independent operation, and
  not supply the dummy current to the first current sensor by turning off the relay during interconnected operation, the dummy current corresponding to forward power flow; and
a controller configured to determine whether a supply state of the dummy current is normal, and control whether to continue operation of the output from the dummy circuit;
wherein the relay is configured to be on during the independent operation and off during the interconnected operation in a state in which the supply state is normal,
wherein the controller is configured to determine whether the supply state is normal on the basis of a set output value to the relay unit and a detection value from the relay unit, and
wherein the controller is configured to
  output a low signal as the set output value during the interconnected operation, and,
  in a case in which the detection value is a low signal, determine that the supply state is not normal, perform error notification, and not continue the operation of the output from the dummy circuit.

7. The power control system according to claim 6,
wherein the controller is configured to, in the case in which the detection value is the low signal, stop the interconnected operation, turn off an independent operation switch, or stop an inverter.

8. A control method for a power control system, the control method comprising:
supplying a dummy current to a current sensor during independent operation, and not supplying the dummy current to the current sensor during interconnected operation, the dummy current corresponding to forward power flow;
determining whether a supply state of the dummy current is normal; and
controlling whether to continue the supply state,
wherein
the determining comprises determining whether the supply state is normal on the basis of a set output value and a detection state that indicates whether the independent operation or the interconnected operation is performed in a state in which the supply state is normal,
the control method further comprises outputting a low signal as the set output value during the interconnected operation,
the determining comprises determining that the supply state is normal, in a case in which the detection state is a high signal, and
the controlling comprises continuing the supply state, in a case in which it is determined that the supply state is normal.

9. The control method according to claim 8, further comprising
outputting a high signal as the set output value during the independent operation,
wherein the determining comprises determining that the supply state is normal, in a case in which the detection state is a low signal, and
the controlling comprises continuing the supply state, in a case in which it is determined that the supply state is normal.

10. A control method for a power control system, the control method comprising:
supplying a dummy current to a current sensor during independent operation, and not supplying the dummy current to the current sensor during interconnected operation, the dummy current corresponding to forward power flow;
determining whether a supply state of the dummy current is normal; and
controlling whether to continue the supply state,
wherein
the determining comprises determining whether the supply state is normal on the basis of a set output value and a detection state that indicates whether the independent operation or the interconnected operation is performed in a state in which the supply state is normal,
the control method further comprises outputting a low signal as the set output value during the interconnected operation,
the determining comprises determining that the supply state is not normal, in a case in which the detection state is a low signal, and
the controlling comprises performing error notification and not continuing the supply state, in a case in which it is determined that the supply state is not normal.

\* \* \* \* \*